United States Patent

[11] 3,634,616

[72] Inventor Bert H. Dann
Mountain View, Calif.
[21] Appl. No. 872,848
[22] Filed Oct. 31, 1969
[45] Patented Jan. 11, 1972
[73] Assignee Bell & Howell Company
Chicago, Ill.

[54] APPARATUS FOR CORRECTING ANGULAR ERRORS IN COLOR VIDEO SIGNALS WITH MODULATORS
13 Claims, 3 Drawing Figs.

[52] U.S. Cl. .......... 178/5.4 CD, 178/6.6 TC, 179/100.2 S
[51] Int. Cl. .......... H04n 5/76, H04n 9/44
[50] Field of Search .......... 178/5.4 CR, 6.6 TC, 5.2; 179/100.2 K, 100.2 S; 325/49

[56] References Cited
UNITED STATES PATENTS
3,141.926 7/1964 Newell .......... 178/5.4 CR
3,504,111 3/1970 Sumida et al. .......... 178/5.4 CR
3,347,997 10/1967 Woodruff .......... 179/100.2 S

*Primary Examiner*—Robert L. Richardson
*Assistant Examiner*—John C. Martin
*Attorney*—Luc P. Benoit

ABSTRACT: Apparatus for correcting effects of angular errors in a color video signal, wherein a first reference signal is modulated by at least a first portion of the spectrum of the video signal, and a second reference signal is modulated by at least a second portion of the spectrum of the video signal, wherein the second reference signal displays relative to said first reference signal an angular difference reflecting said angular errors, and wherein a composite modulated signal is produced in response to said modulated first and second portions, which composite modulated signal includes sideband components representing chrominance information of said color video signal and being disposed about a frequency which differs from a video picture carrier frequency by a stable frequency difference.

INVENTOR.
BERT H. DANN
BY
ATTORNEY

INVENTOR.
BERT H. DANN
BY [signature]
ATTORNEY

APPARATUS FOR CORRECTING ANGULAR ERRORS IN COLOR VIDEO SIGNALS WITH MODULATORS

CROSS-REFERENCES TO RELATED APPLICATIONS

Patent application Ser. No. 872,847, "Signal Correcting Apparatus," filed Oct. 31, 1969, by Bert H. Dann, and assigned to the subject assignee;

Patent application Ser. No. 873,284, "Signal Correcting Apparatus," filed Nov. 3, 1969, by Bert H. Dann, and assigned to the subject assignee;

Patent application Ser. No. 56,787, "Signal Correcting Apparatus," filed July 21, 1970, by Bert H. Dann, and assigned to the subject assignee; and Patent application Ser. No. 873,416, "Signal Correcting Apparatus," filed Nov. 3, 1969, by Bert H. Dann and Floyd M. Gardner, and assigned to the subject assignee.

BACKGROUND OF THE INVENTION

1. Field of the Invention

The subject invention relates to signal processing systems and, more particularly, to apparatus for correcting effects of angular errors in video signals.

2. Description of the Prior Art

The desire to improve methods and apparatus for correcting effects of angular errors in video signals has received renewed impetus from the advent of color video tape recording systems. Accordingly, the prior art and the subject invention will be described in terms of relevant problems arising in connection with color video signal recording and playback systems, although the invention is not limited to that field, as those skilled in the art will appreciate.

Briefly stated, a composite color video signal comprises a luminance component and a chrominance component. The latter includes phase and amplitude modulated components disposed about a suppressed subcarrier which, in the NTSC system, nominally oscillates at 455 times half-line frequency or at approximately 3.58 MHz. In certain low-cost industrial systems, the latter half-line frequency factor is not necessarily observed, although the nominal line-scan and color-subcarrier frequencies correspond very closely to those of the NTSC system.

If a composite color video signal is recorded on and reproduced from magnetic tape, to name an example, factors such as flutter and wow in the recording and playback processes, tape shrinking and elongation, and head-to-tape spacing irregularities produce angular variations in the reproduced video signal.

Such angular errors in the luminance component are generally tolerated by the eye, particularly if they are kept within sensible limits by the use of adequate recording and playback machines. By contrast, the above-mentioned nature of the chrominance component makes this component particularly vulnerable to angular errors, as is easily seen from the fact that the phase-modulated component in the chrominance signal contains color hue information and that the eye is particularly sensitive to hue aberrations. Moreover, a shift in average frequency in the color reference carrier rate of the played-back video signal of typically more than about ± 100 to 200 Hz. exceeds the pull-in range of the color-reference synchronization circuits of typical color monitors or color television receivers employed for viewing the played-back signal. This at least results in a complete random display of colors. In the vast majority of color television receiving sets, no color at all will, however, be displayed since the lack of color reference synchronization prevents the conventionally employed chroma gating or "color killer" circuits from enabling the color circuits of the set.

In an effort to counter these detrimental effects, the use of variable time delay devices for correcting time base errors in the reproduced signal has been proposed. These devices, however, are costly and introduce substantial complexities into the playback system. Moreover, their range of operation is typically limited, so that their use presupposes a preliminary error correction and the availability of high-precision recording and playback machines.

According to a more practical proposal, the degraded chrominance portion of the reproduced video signal is decoded into separate color components by means of a reference signal which reflects angular errors in the video signal and which is either derived from one or more pilot signals recorded and reproduced with the video signal, or from the color synchronizing signal or "color bursts" contained in the reproduced chroma signal.

In these systems, a certain measure of correction is realized from the fact that the decoding reference signal is affected with practically the same angular errors as the played-back chrominance signal.

Typically, the decoded color components are reconstituted on a stable carrier by means of a color encoder driven by a locally generated subcarrier. In theory, it would be possible to omit the latter encoding process and to apply the demodulated color components directly to the television set employed for viewing the played-back video program. This, however, would require direct access to the internal circuitry of the set, whereas the general endeavor moves in the direction of providing recording and playback equipment that does not require major intrusions into the viewing set circuitry.

Accordingly, both the above-mentioned decoding and encoding stages and processes are generally required. This being the case, the prior art proposal under consideration in effect proceeds to the extent of breaking the color signal down into different color components just for the purpose of correcting angular errors therein. Such a drastic procedure is generally disadvantageous, since it implies too many sources of potential error which may further degrade the color signal.

A different approach is apparent from another proposal according to which the played-back color signal is separated from the bulk of the luminance signal and is heterodyned with a locally produced stable signal of a first frequency, while an error signal reflecting the degradation of the color signal is heterodyned with a locally produced stable signal of a second frequency. It can be seen that these heterodyning and subsequent sideband selecting operations produce two signals, each of which is afflicted with angular errors of the played-back color signal. Accordingly, it is possible to eliminate the effect of such errors by heterodyning the latter two signals with each other and selecting the difference-frequency component from the result of this heterodyning step.

By an appropriate selection of the respective frequencies of the signals participating in the heterodyning processes, the modulation components of the resulting color signal can be made to be disposed about a stable carrier of standard color subcarrier frequency.

While this proposal alleviates the above-mentioned disadvantage of the previously discussed decoding-encoder system, its practical realization results in a complex arrangement including a plurality of modulators, filters and frequency translators which participate directly in the signal processing operation and must thus meet rather high standards.

In consequence, recent activities in the subject area have primarily been characterized by a proliferation of color-component decoding systems of the initially mentioned type.

SUMMARY OF THE INVENTION

From one aspect thereof, the invention resides in apparatus for correcting effects of angular errors in a color video signal, comprising in combination:

first means for providing a first reference signal and a second reference signal displaying relative to said first reference signal an angular difference reflecting said angular error;

second means for providing a first modulated signal by modulating said first reference signal with at least a first predetermined portion of the spectrum of said video signal;

third means for providing a second modulated signal by modulating said second reference signal with at least a second predetermined portion of the spectrum of said video signal; and fourth means connected to said second and third means for producing in response to said first and second modulated signals a composite modulated signal in which sideband components representing chrominance information of said color video signal are disposed about a frequency which differs from a video picture carrier frequency by a stable frequency difference.

Other aspects of the invention will become apparent as this description proceeds.

BRIEF DESCRIPTION OF THE DRAWINGS

The invention will become more readily apparent from the following detailed description of preferred embodiments thereof, illustrated by way of example in the accompanying drawings, in which.

DESCRIPTION OF THE PREFERRED EMBODIMENTS

Figure 1:
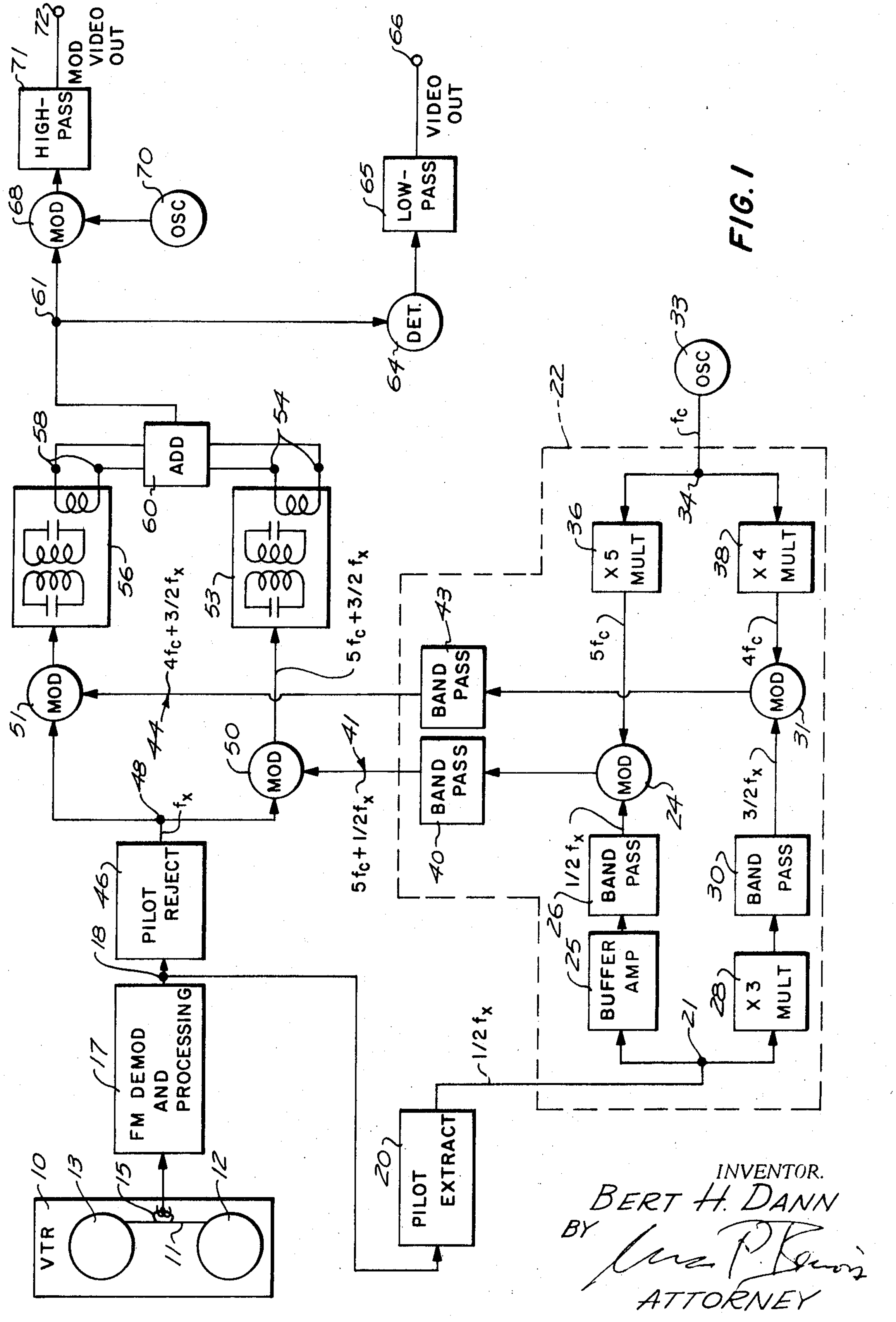
FIG. 1 is a block diagram of a signal-correcting apparatus in accordance with a first preferred embodiment of the invention.

FIG. 1 symbolically shows a video tape recording apparatus 10 on which a magnetic recording tape 11 is wound from a reel 12 onto a reel 13 by means of conventional machinery (not shown). A color video signal recorded on the tape 11 is reproduced by means of playback head 15.

In practice, it is customary to keep the required velocity of the tape 11 within feasible limits by having the playback head 15, or a plurality of playback heads, execute a transverse or slant-track scan relative to the tape 11. Means for accomplishing these and other advantageous scanning patterns are well known in the art and are thus not illustrated herein.

It is also generally known to be advantageous to subject composite video signals to a selected modulation prior to the recording thereof so as to improve the quality of the reproduced video signal. So far, frequency modulation has been most widely used for this purpose, but nothing mentioned or indicated herein is intended to preclude the use of any other suitable kind of modulation, or the use of direct or unmodulated recording.

The signal played back by means of the head 15 is applied to a processing stage 17 which includes amplifier, demodulator and related means of the type customarily employed to render a reproduced composite video signal suitable for further processing. It should be understood in this connection that the modulator in block 17 does not resolve the composite video signal into its components, but rather demodulates such signal from the FM carrier or other modulation used for recording purposes as mentioned above.

In connection with the system illustrated in FIG. 1, it is assumed that a pilot signal has been recorded and is being played back along with the composite video signal. The utilization and processing of such pilot signals, which are affected by the same angular errors as the composite video signal, is known in the art. In a sense, the angle-modulated pilot signal may be considered as included in the video signal which is applied by the stage 17 to a point 18.

A pilot extraction circuit 20 is connected to the point 18 and provides a signal of a frequency of $\frac{1}{2}f_x$ at an input 21 of reference signal generator means 22. The frequency $f_x$ in $\frac{1}{2}f_x$ is defined by:

$$f_x = f_r(1+\Delta)$$

wherein $f_r$ is the standard color subcarrier frequency (approximately 3.58 MHz. in the NTSC system) which prevailed at the time of recording, while $\Delta$ designates angular errors (typically time varying) in the played-back signal.

The pilot extraction circuit 20 may include conventional band-pass filtering means for deriving the pilot signal, which may be at a frequency of $\frac{1}{2}f_x$ as played back from the tape. The $\frac{1}{2}f_x$ signal is applied to a first input of a mixer or modulator 24 after processing thereof by a buffer amplifier 25 and a band-pass filter 26 which rejects noise and spurious signal components. A frequency multiplier 28 connected to the point 21 multiplies the frequency of the $\frac{1}{2}f_x$ signal, so as to produce a signal of a frequency of $3/2f_x$, which is filtered from noise and spurious signal components by a band-pass filter 30 and which thereupon is applied to one input of a mixer or modulator 31.

A local oscillator 33 applies to a second input 34 of the reference signal generator means 22 a stable signal of a frequency $f_c$, wherein $f_c$ is equal to the standard color subcarrier frequency (approximately 3.58 MHz. in the NTSC system). A frequency multiplier 36 is connected to the input 34 and multiplies the stable $f_c$ signal by a factor of five so as to provide a second input of the modulator 24 with a stable reference signal of a frequency of $5f_c$. A second stable reference of a frequency of $4f_c$ is applied to a second input of the modulator 31 by a factor-of-four multiplier 38 connected to the input 34 of the reference signal generator means 22. The modulator 24 heterodynes the $5f_c$ signal with the $\frac{1}{2}f_x$ signal, and a band-pass filter 40 extracts from the product of such modulation a reference signal 41 having a frequency equal to $(5f_c+\frac{1}{2}f_x)$. The modulator 31 heterodynes the $4f_c$ signal with the $3/2f_x$ signal, and a band-pass filter 43 extracts from the product of such modulation a reference signal 44 of a frequency equal to $(4f_c+3/2f_x)$.

Comparing the reference signals 41 and 44, it will be noted that they differ from each other by a frequency of a magnitude of $(f_c-f_x)$, a fact which is of considerable importance as will be appreciated as this description proceeds.

A pilot rejection circuit 46 connected to the point 18 includes conventional band-pass or trap means for rejecting the pilot from the video signal occurring at point 18. This video signal, having the above-mentioned pilot removed therefrom is applied to a point 48 and from there to a first input of a modulator 50 and to a corresponding input of a modulator 51.

The modulator 50 is driven by the reference signal 41 to modulate the video signal derived from point 48 on a carrier of a frequency of $(5f_c+\frac{1}{2}f_x)$. A band-pass filter 53 extracts from the output product of the modulator 50 components disposed about the frequency $(5f_c+3/2f_x)$ and applies such components to output terminal means. 54. This frequency of $(5f_c+3/2f_x)$ corresponds to the frequency of the color reference subcarrier in the unprocessed played-back video signal. In other words, the filter 53 extracts the upper sidebands which are generated when the reference signal 41 is modulated by the played-back video signal.

The modulator 51 is driven by the reference signal 44 to modulate the video signal derived from the point 48 on a carrier of a frequency of $(4f_c+3/2f_x)$. A further band-pass filter 56 is connected to the output of the modulator 51. This band-pass filter 56 preferably is complementary to the band-pass filter 53. To name an example, each of the band-pass filters 53 and 56 may have a passband of 2.5 MHz., while the upper cutoff frequency of the filter 56 may correspond substantially to the lower cutoff frequency of the band-pass filter 53. The crossover between the two cutoff points just mentioned is preferably selected so that the signal passed by the filter 53 contains predominantly chrominance information, while the signal passed by the filter 56 comprises predominantly luminance information.

More specifically, the band-pass filter 56 extracts from the output product of the modulator 51 a component which includes predominantly luminance information and a picture carrier for such luminance information located at a frequency of $(4f_c+3/2f_x)$, which is equal to the frequency of the reference signal 44 applied to the modulator 51. The modulated component extracted by the band-pass filter 56 is applied to its output terminal means 58. An adding network or amplifier 60 combines the two signals from the terminal means 54 and 58 to provide a composite modulated signal in which the picture carrier is at a frequency of $(4f_c+3/2f_x)$ while the suppressed nominal color subcarrier is at a frequency of $(5f_c+3/2f_x)$ as already mentioned. If $(4f_c+3/2f_x)$ is subtracted from $(5f_c+3/2f_x)$ it is seen that the $\Delta$-affected $f_x$ component drops out, and that the chrominance subcarrier of the composite signal appearing at the output terminal 61 of the adding means 60 is in effect displaced from the picture carrier by a stable frequency equal to $f_c$.

In practical terms, the fact that the chrominance subcarrier is displaced from the picture carrier by a stable frequency means that the chrominance information contained in the chrominance signal can be detected in a manner substantially free of angular errors of the above-mentioned type.

If desired, a reference signal derived from the output of the band-pass filter 43 may be employed for demodulating the signal provided at 61. However, to illustrate a simpler alternative solution, FIG. 1 shows an envelope detector 64 which demodulates the video signal to baseband. A low-pass filter 65 extracts the demodulated composite color video signal from the output of the detector 64 and applies such signal to a system output 66. The composite color video signal may thereupon be applied to further processing means, such as video signal circuits of a conventional television receiver (not shown) which provides and displays the luminance and chrominance information contained in such signal.

As an alternative solution, FIG. 1 shows a modulator 68 which is connected to the terminal 61 and which modulates the color video signal appearing at the terminal 61 unto a suitable carrier provided by an oscillator 70. To name an example, the signal appearing at terminal 61 may be modulated on a very high frequency or ultrahigh frequency carrier so as to be applicable to antenna terminals or other conveniently accessible parts of a color television receiver. A high pass filter 71 extracts the desired frequency component from the output of the modulator 68 and applies such component to a system output 72 which may, for instance, be connected to the named antenna terminals.

It will now be appreciated that the invention provides efficient methods and means for correcting effects of angular errors in color video signals and redisposing chrominance sidebands about a substantially stable nominal subcarrier.

A further advantage of the embodiment illustrated in FIG. 1 is apparent from the fact that the modulators 50 and 51 may be of substantially the same design, while the filters 53 and 56 may be complementary as mentioned above, so that unequal phase shifts in the two processing branches are largely precluded. Moreover, high-resolution luminance information may be processed in the lower branch including the filter 53 along with chrominance information, while lower sideband components of the chrominance signal may be processed in the upper branch including the filter 56.

Figures 2, 3:
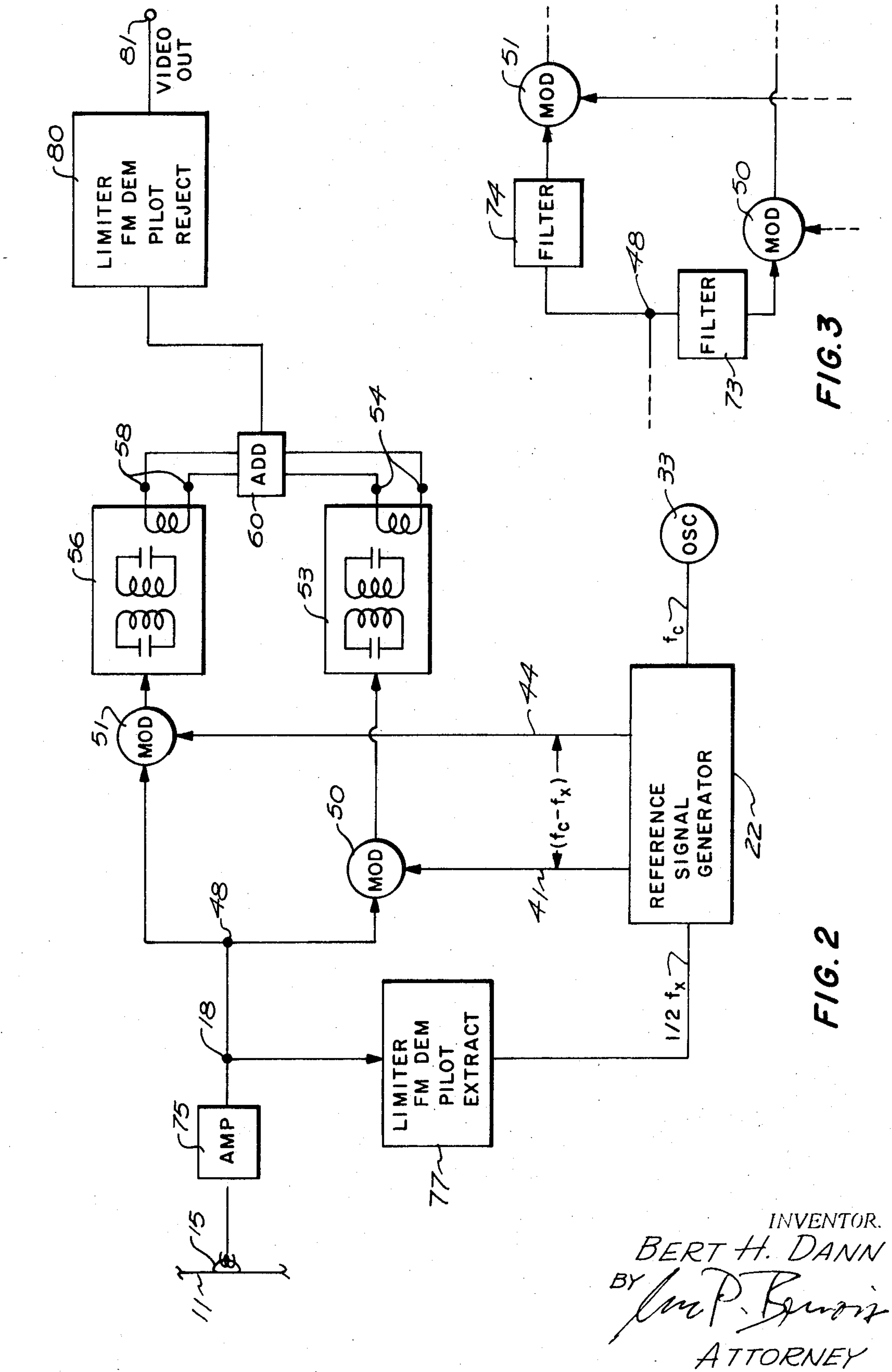
FIG. 2 is a block diagram of a second signal-correcting apparatus according to a further preferred embodiment of the invention.
FIG. 3 is a schematic of a modification of the system of FIG. 1 or FIG. 2.

An embodiment of another aspect of the invention is apparent from FIG. 2. In this figure, like reference numerals are employed to designate like or functionally equivalent parts as among the FIGS. 1 and 2.

According to FIG. 2, the video signal played back from the tape 11 with the aid of the playback head 15 is not demodulated from its above-mentioned recording carrier but is merely amplified and, if desired, suitably shaped, by a circuit 75. The resulting amplified signal, which is still modulated on its recording carrier, is applied to corresponding inputs of the modulators 50 and 51, if desired through filters 73 and 74 discussed in connection with FIG. 3. The modulators 50 and 51 are driven by the previously defined reference signals 41 and 44 provided by the reference signal generator means 22. These means may be of the same type as the reference signal generator means illustrated in FIG. 1 which are provided with a signal of a frequency of $\frac{1}{2}f_x$ and a stable signal of a frequency of $f_c$ and which provide the two reference signals 41 and 44 which differ from each other by a frequency of a magnitude of $(f_c-f_x)$.

The $\frac{1}{2}f_x$ reference signal is provided by a pilot extraction circuit 77 which is connected to the point 18 and which may include the same elements as the pilot extraction circuit 20 of FIG. 1, together with limiter and demodulator means for deriving the pilot signal from the recording-carrier-modulated video signal furnished by the amplifier 75. The processing of the signal components in the modulator 50 and band-pass filter 53 and in the modulator 51 and passband filter 56 generally proceeds in the same manner as the processing of the video signal in the corresponding portions of the apparatus illustrated in FIG. 1. As before, the signals at the output means 54 and 58 of the band-pass filters 53 and 56 are combined by an adding amplifier or network 60, which applies the combined signal to demodulator means 80 which may include similar signal processing and demodulator means as the block 17 in FIG. 1. In contrast to the block 17, the block 80 in FIG. 2 includes, however, band-pass or trap means for rejecting the pilot which is still in the processed video signal. The stage 80 preferably operates to demodulate the composite video signal derived from the adding network 60 to base band. If desired, the video signal may be modulated on a carrier of very high or ultrahigh frequency, for example, as discussed in connection with FIG. 1.

The principle embodied in FIG. 2 has several important advantages. By way of comparison, it is known that highly beneficial results are obtained if a composite video signal is time modulated prior to recording, as has already been mentioned above in connection with the block 17 in FIG. 1. These results include a better utilization of the available bandwidth, decreased vulnerability to spurious variations in signal strength, and other factors which promote the fidelity of the reproduced video signal. Comparable benefits are realized if the played-back video signal, while still in the time-modulated condition into which it was brought for recording purposes, is subjected to processing so as to correct effects of angular errors imposed during the recording-playback process.

Moreover, circuit economy may be realized from the fact that the demodulator stage 80 shown in FIG. 2 is capable to demodulate the processed color video signal directly to base band and thus combines the functions of the demodulator stage 17 and the envelope detector 64 shown in FIG. 1.

Those skilled in the art will recognize that the frequency values given herein have only been indicated by way of example. For instance, the reference signals 41 and 44 could have values other than $(5f_c+\frac{1}{2}f_x)$ and $(4f_c+3/2f_x)$ as long as their difference is such that the chrominance subcarrier in the processed video signal is displaced from the picture carrier by a substantially stable amount in terms of frequency, and as long as the reference signal which of the two reference signals has the higher frequency is employed in the processing of the chrominance component to avoid a sign reversal of the chrominance phases. Depending on available pilot frequency restoration facilities, the processed pilot may be at a frequency submultiple other than $\frac{1}{2}f_x$ or may, for example, be at $f_x$, while the stable signal produced by the oscillator 33 may be at a frequency other than the standard chrominance subcarrier frequency of approximately 3.58 MHz.

It should also be appreciated that the invention is not dependent in its operation on the availability of a pilot recorded with the video signal. Rather, angular error or $\Delta$ information required for the operation of systems according to the invention may be derived from color synchronization or color burst information contained in the chrominance signal. Systems which derive information about angular errors in color video signals from color synchronization signals are known in the video tape recording art.

In some instances a preliminary division of the played-back video signal prior to the action of the modulators 50 and 51 will be found advantageous. An example of means for effecting such a preliminary division is shown in FIG. 3 according to which a filter 73 is inserted between the point 48 and the modulator 50, and a filter 74 is inserted between the point 48 and the modulator 51 of either the system of FIG. 1 or the system of FIG. 2. The filter 73 may be designed in a conventional manner to pass a spectrum of the signal occurring at 48 which contains predominantly chrominance information and if desired high-resolution luminance information, while the filter 74 may be designed to pass a spectrum of the signal occurring at 48 which contains predominantly luminance information.

The preliminary division effected by the filters 73 and 74 of FIG. 3 or by equivalent means permits a simplification of the design of the band-pass filters 53 and 56 and a suppressed carrier operation of the modulator 50 to prevent a leaking of the reference signal 41 to the adding network 60 where it could beat with the reference signal 44.

I claim:

1. In apparatus for correcting effects of angular errors in a color video signal, in combination:

first means for providing a first reference signal and a second reference signal displaying relative to said first reference signal an angular difference reflecting said angular error;

second means for providing a first modulated signal by modulating said first reference signal with at least a first predetermined portion of the spectrum of said video signal;

third means for providing a second modulated signal by modulating said second reference signal with at least a second predetermined portion of the spectrum of said video signal; and fourth means connected to said second and third means for producing in response to said first and second modulated signals a composite modulated signal in which sideband components representing chrominance information of said color video signal are disposed about a frequency which differs from a video picture carrier frequency by a stable frequency difference.

2. Apparatus as claimed in claim 1, wherein said first means for providing said reference signals include:

means for providing a pilot signal varying in response to said angular errors;

means for providing a substantially stable signal; and means for providing said second reference signal relative to the first reference signal with an angular difference corresponding to the angular difference between said substantially stable signal and said pilot signal.

3. Apparatus as claimed in claim 1, wherein said first means for providing said reference signals include:

means for providing a signal having a time-varying frequency $f_x$ representing an angle modulation by said angular errors of a signal oscillating at a standard color subcarrier frequency $f_c$;

means for providing a substantially stable signal oscillating at said standard color subcarrier frequency $f_c$; and means for providing said second reference signal relative to the first reference signal with an angular difference of $(f_c-f_x)$, wherein $f_c$ is said standard color subcarrier frequency, and $f_x$ is said time-varying frequency.

4. Apparatus as claimed in claim 1, wherein:

a. said second means include means for providing said first modulated signal by modulating said first reference signal with said video signal; and b. said third means include means for providing said second modulated signal by modulating said second reference signal with said video signal.

5. Apparatus as claimed in claim 1, including means for providing said first predetermined portion of said spectrum predominantly with luminance information of said color video signal.

6. Apparatus as claimed in claim 1, including means for providing said second predetermined portion of said spectrum predominantly with chrominance information of said color video signal.

7. Apparatus as claimed in claim 1, including filter means for filtering luminance information from said color video signal, and means connected between said filter means and said second means for applying said luminance information to said second means as said first predetermined portion of said spectrum.

8. Apparatus as claimed in claim 1, including filter means for filtering chrominance information from said color video signal, and means connected between said filter means and said third means for applying said chrominance information to said third means as said second predetermined portion of said spectrum.

9. Apparatus as claimed in claim 1, wherein said fourth means include:

a. fifth means connected to said second means for extracting from said first modulated signal a component including predominantly luminance information of said color video signal and a picture carrier for said luminance information;

b. sixth means connected to said third means for extracting from said second modulated signal a component including predominantly chrominance information of said color video signal; and c. seventh means connected to said fifth and sixth means for combining said component extracted by said fifth means and said component extracted by said sixth means.

10. Apparatus as claimed in claim 9, including demodulating means connected to said seventh means for demodulating said combined components to baseband.

11. Apparatus as claimed in claim 9, including modulating means connected to said seventh means for modulating said combined components on a predetermined carrier.

12. Apparatus as claimed in claim 9, wherein said first means include means for providing said second reference signal with a higher frequency than said first reference signal.

13. Apparatus as claimed in claim 1, wherein:

a. said color video signal is a signal which has been subjected to modulation for recording purposes; and b. said fourth means include means for effecting a demodulation of said modulation for recording purposes.

* * * * *